Figure 1:
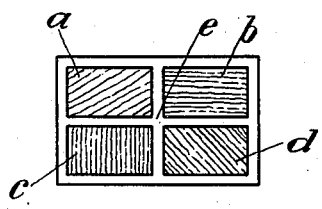

May 28, 1940.   A. H. KAMPFER ET AL   2,202,737
PHOTOGRAPHIC FILTER
Original Filed Oct. 7, 1937

Patented May 28, 1940

2,202,737

UNITED STATES PATENT OFFICE 2,202,737

PHOTOGRAPHIC FILTER

Adolf H. Kampfer and Albert Schattmann, Charlottenburg, Berlin, Germany; said Schattmann assignor to said Kampfer Original application October 7, 1937, Serial No. 167,850. Divided and this application March 7, 1939, Serial No. 260,418. In Germany October 14, 1936

1 Claim. (Cl. 95—81.5)

This invention comprehends certain new and useful improvements in cinematography, and the invention has for its object a new and improved photographic filter which will be hereinafter fully described and claimed, this application being a divisional of our application Serial Number 167,-850, filed October 7, 1937, such application claiming the new method embodied in our inventive idea, while the present application is drawn to cover more specifically the photographic filter itself as an article of manufacture.

It is already known in the copying of cinematograph films to dispose light-reducing means between the light source and the negative, viz., to employ alternately means of this nature having different powers of transmitting the light dependent on the density of the single successive scenes in the negative which have been taken under different lighting conditions (studio or outdoor exposures or the like). This step is taken in order to obtain a greater evenness in the density of the exhibited film.

If it were desired to copy also the known summation color films, which include within the frame of a normal cinematograph film picture a group comprising a plurality of, for example four, color component images of reduced size taken thru different color filters, on the lines set forth in the above by disposing in front of the complete cinematograph film picture in the manner aforesaid a uniform light-absorbing filter having greater or weaker absorbing properties dependent on the fact as to whether the exposure has been made in a studio or in the open air, the result obtained would not be satisfactory. The color component images belonging to one group each have densities differing one from the other, so that a uniform light-reducing filter disposed in front of the complete group cannot make allowance for their individual requirements.

As regards the light-reducing means to be employed, discrimination must accordingly be made between two different aspects, viz., on the one hand the reducing of the light from scene to scene (as in the known method in its application to cinematograph pictures of normal size), and on the other hand the absorption of the light within the group.

There are employed, therefore, in accordance with the invention, groups of filters having within the area of a normal cinematograph film picture a plurality of, for example four, part-areas which have in relation to one another different light-reducing characteristics corresponding to the particular color component images.

Preferably there are employed a plurality of these groups of filters, each of which possesses a greater or weaker density in relation to the others, but in which the light-transmitting powers of the single part-areas are in the same ratio. Usually two groups of filters will be found to be sufficient, one for outdoor and the other for indoor exposures. In this way the density ratio of the part-images in each group may be fixed in relation to one another in one single copying process in the manner called for by the tuning of the group in the film which is to be projected in natural colors.

The invention is illustrated by way of example in the accompanying drawing, which shows two groups of filters.

Figure 1 illustrates a face view of a group of filters, in which the light absorption of the part-area $a$ is ten percent, that of the part-area $b$ twenty percent, that of the part-area $c$ fifteen percent, and that of the part-area $d$ eight percent.

Figure 2:
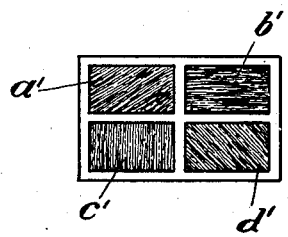

Fig. 2 shows a face view of a group of filters, in which the light absorption is twice that of the filters in Fig. 1. The ratio between the corresponding part-areas $a'$, $b'$, $c'$, $d'$ is accordingly as 20:40:30:16. The cross frame $e$ separating the single part-areas is fully transparent, so that a black frame is formed in the positive film.

The groups of filters for a different sequence of scenes are exchanged either by hand or by automatic means of the kind known per se in conjunction with the ordinary type of absorption filter.

What is claimed is:

As an article of manufacture, a photographic filter comprising a frame having the dimensions of the standard cinematographic frame of normal size, the frame enclosing a plurality of part-area filters of different densities, the part-area filters being separated from each other by transparent cross bars defining the individual part-areas.

ADOLF H. KAMPFER.
ALBERT SCHATTMANN.